(12) United States Patent
Maheshwari et al.

(10) Patent No.: US 8,848,681 B2
(45) Date of Patent: Sep. 30, 2014

(54) HEADER TYPE NOTIFICATION FOR CO-EXISTENCE OF LEGACY HEADER AND NEW HEADERS ON SAME RADIO LINK

(75) Inventors: Shashikant Maheshwari, Irving, TX (US); Yousuf Saifullah, Richardson, TX (US); Nico Van Waes, Keller, TX (US)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1236 days.

(21) Appl. No.: 12/597,797

(22) PCT Filed: Apr. 25, 2008

(86) PCT No.: PCT/IB2008/051613
§ 371 (c)(1),
(2), (4) Date: May 20, 2010

(87) PCT Pub. No.: WO2008/132683
PCT Pub. Date: Nov. 6, 2008

(65) Prior Publication Data
US 2010/0290384 A1  Nov. 18, 2010

Related U.S. Application Data

(60) Provisional application No. 60/926,478, filed on Apr. 27, 2007.

(51) Int. Cl.
*H04J 1/00* (2006.01)
*H04J 1/10* (2006.01)

(52) U.S. Cl.
USPC .......................................... 370/343; 340/315

(58) Field of Classification Search
USPC ....................................................... 370/343
See application file for complete search history.

(56) References Cited

U.S. PATENT DOCUMENTS

| | | | | |
|---|---|---|---|---|
| 7,339,921 | B2 * | 3/2008 | Kim et al. | 370/349 |
| 7,564,831 | B2 * | 7/2009 | Ihm et al. | 370/349 |
| 7,630,391 | B2 * | 12/2009 | Jin et al. | 370/431 |
| 8,165,058 | B2 * | 4/2012 | Tao et al. | 370/315 |
| 2005/0201416 | A1 * | 9/2005 | Chang et al. | 370/469 |
| 2005/0208945 | A1 * | 9/2005 | Hong et al. | 455/436 |
| 2005/0286451 | A1 * | 12/2005 | Kim et al. | 370/310 |
| 2007/0014288 | A1 * | 1/2007 | Lim et al. | 370/389 |
| 2007/0041378 | A1 * | 2/2007 | Ihm et al. | 370/389 |

OTHER PUBLICATIONS

Jeffry Z. Tao, Koon Hoo Teo, Jinyun Zhang, Mitsubishi Electric, "Proposal for Relay MAC PDU Format; IEEE C802.16j-07/198r2; IEEE 802.16j Mobile Multihip Relay Task Group" IEEE 803.16 J Mobile Multihop Relay Task Group, Mar. 5, 2007, p. 1-8.

(Continued)

*Primary Examiner* — Shaq Taha

(57) ABSTRACT

The exemplary embodiments of this invention generally relate to message header-type notification that, for example, enables the co-existence of a legacy header type with one or more new header types on a same radio link. In one non-limiting, exemplary embodiment, a method includes: determining a type of medium access control (MAC) header to transmit in a MAC transmission; setting a value of a notification field in a resource allocation message based on the determined type of MAC header; and transmitting the resource allocation message. In another non-limiting, exemplary embodiment, a method includes: receiving a resource allocation message having a notification field; and using a value of the notification field to determine a type of medium access control (MAC) header for a MAC transmission.

21 Claims, 4 Drawing Sheets

(56) References Cited

OTHER PUBLICATIONS

Relay Task Group of IEEE 802.16, P802.16J: "Part 16: Air Interface for Fixed and Mobile Broadband Wireless Access Systems Multihop Relay Specification; 802.16j-06/026r3" IEEE 802.16J Baseline Document, Apr. 10, 2007, p. 1-126.

Jeffery Z. Tao, Koon Hoo Teo, Jinyun Zhang Mitsubishi Electric; "Proposal for Relay MAC PDU Format; IEEE 802.16j-071198r6 Mobile Multihop Relay Task Group", IEEE 802.16J Mobile Multihop Relay Task Group, Mar. 5, 2007, p. 1-11.

IEEE: "Part 16: Air Interface for Fixed and Mobile Broadband Wireless Access Systems Amendment 2: Physical and Medium Access Control Layers for Combined Fixed and Mobile Operation in Licensed Bands; IEEE Std. 802.16e?-2005 and IEEE Std 802.16?-2004/Cor1-2005 (Amdm. and Corrig. to IEEE Std 802.16/2004)" 802.16E IEEE Standard for Local and Metropolitan Area Networks, Feb. 28, 2006, p. 1-36.

International Search Report and Written Opinion Related to PCT Application No. PCT/IB2008/051613 issued on Oct. 9, 2008, p. 1-9.

\* cited by examiner

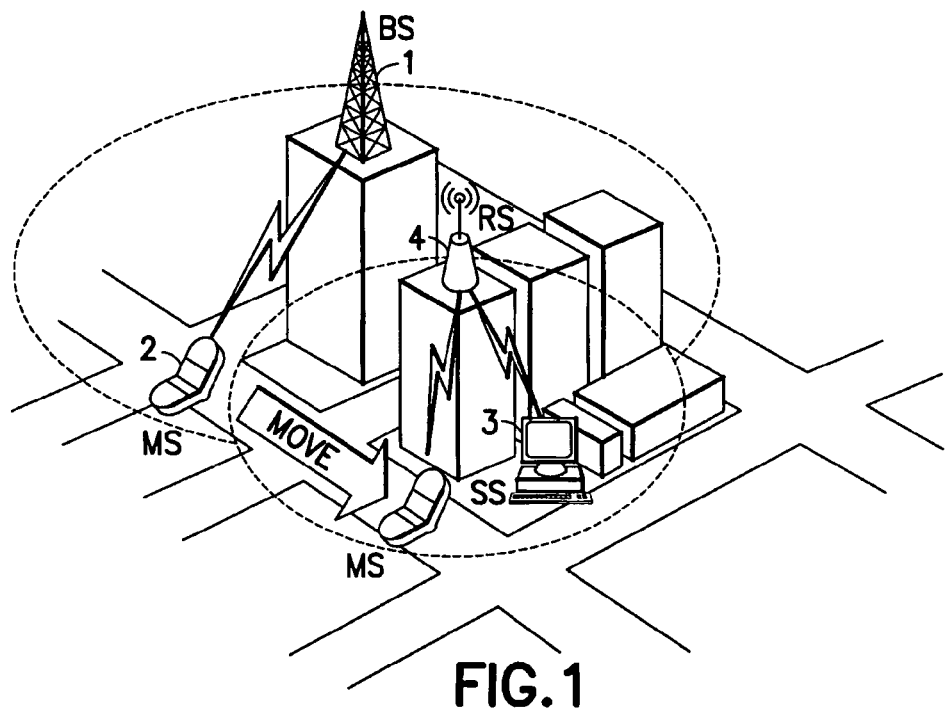
FIG.1
| LEGACY GENERIC MAC HEADER | ONE OF MORE RE OPTIONAL SUB HEADER | OPTIONAL PAYLOAD | OPTIONAL CRC |
FIG.3
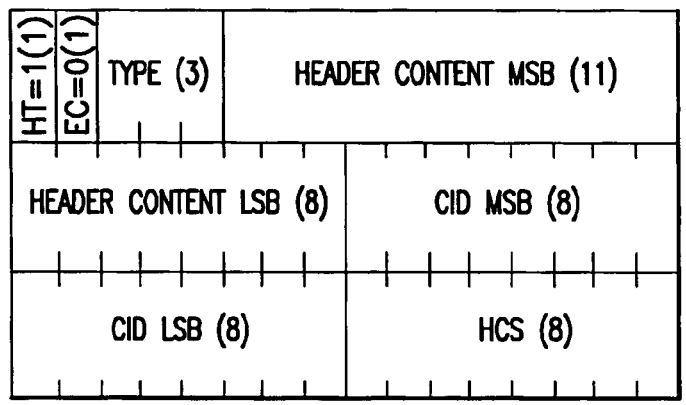
FIG.4
| NEW GENERIC MAC HEADER | ONE OF MORE RE OPTIONAL SUB HEADER | OPTIONAL PAYLOAD | OPTIONAL CRC |
FIG.5

HEADER TYPE NOTIFICATION FOR CO-EXISTENCE OF LEGACY HEADER AND NEW HEADERS ON SAME RADIO LINK

RELATED APPLICATION

This application was originally filed as PCT Application No. PCT/IB2008/051613 on Apr. 25, 2008 and claims priority to U.S. Provisional Application No. 60/926,478 filed on Apr. 27, 2007, which is incorporated herein by reference in its entirety.

TECHNICAL FIELD

The exemplary and non-limiting embodiments of this invention relate generally to wireless communication systems, methods, devices and computer program products and, more specifically, relate to techniques for sending messages through a wireless communication system, including, but not limited to, WiMAX and WiMAX-type wireless communication systems that include, or that do not include, at least one relay.

BACKGROUND

Various abbreviations that appear in the specification and/or in the drawing figures are defined as follows:
AP access point
BS base station
CID connection identifier
CRC cyclic redundancy code
CS convergence sublayer
DCD downlink configuration descriptor
DL downlink (BS to MS)
DL-MAP downlink MAP
HT header type
IE information element
IMT international mobile telecommunications
IS infrastructure station
MAC media access control
MPDU MAC PDU
MR multi-hop relay
MS mobile station
PDU protocol data unit
R-DL-MAP relay Downlink MAP
R-MAP relay MAP
RS relay station
R-UL-MAP relay Uplink MAP
SBC-REQ SS basic capability request
SBC-RSP SS basic capability response
SS subscription station
TG task group
UCD uplink configuration descriptor
UL uplink (MS to BS)
UL-MAP uplink MAP
VoIP voice over internet protocol
WG working group
WiMAX worldwide interoperability for microwave access (IEEE 802.16 standard)

A wireless communication system may or may not include a relay node or network. One example of a relay network is a multi-hop system in which end nodes (MS/SS) are connected to the BS or AP via at least one RS. All of the traffic between the MS/SS and the BS/AP passes through and may be processed by the at least one RS. An example of such a relay concept is the 802.16 MR, which is a new study item established in the IEEE 802.16 WG. The MR-related effort focuses on defining a network system that uses RSs to extend the network coverage and/or enhance system throughput. An exemplary usage scenario of the RS is shown in FIG. 1.

In this non-limiting example, there is a BS 1, a MS 2, a SS 3 (such as a portable computer having wireless communication capability), and a RS 4. Note in this example that the MS 2 is first directly connected to the BS 1 (with no interposed RS), and after movement the MS 2 is connected to the BS 1 via the RS 4. The SS 3 is assumed for this example to be located such that it is always connected to the BS 1 via the RS 4. The BS 1 can provide connectivity to one or more communication networks, including the Internet, for enabling browsing, downloads, uploads and voice communication, such as VoIP communications, as non-limiting examples.

In general, in many different types of communication systems, when messages are transmitted from one node to another node a header is used. The header may indicate the type of message, a connection identifier and/or the type of message payload, as non-limiting examples of message header information. In IEEE 802.16 d/e (WiMAX), a generic MAC header is defined at the MAC layer. FIG. 3 shows a MAC PDU with a conventional (legacy) generic WiMAX MAC header.

Recently, new technology TGs have been created within IEEE 802.16. One is known as IEEE 802.16j (relay), which is tasked with defining the introduction of relays between the BS and MS. Another new group is IEEE 802.16m, which is tasked with defining the evolution of WiMAX and the support of IMT-A requirements.

The relay TG (IEEE 802.16j) has introduced another link, the relay link, between the BS 1 and the RS 4, and between RSs. Similarly, 802.16m is defining enhancements to the access link. Both of these approaches, however, will need to support the legacy IEEE 802.16e specifications, even though the new links may have different requirements and features and, therefore, may require new MAP headers to support enhanced features.

One approach would be to define a new header by modifying the generic MAC header. Another approach would be to define a totally new generic MAC header(s) suitable for use with the new links. However, in the first approach (modifying the generic MAC header to define a new header) there is overhead involved in using header information fields that are not relevant for the newly defined links (e.g., for the relay of 802.16m links). In addition, most of the bits in the generic MAC header are already defined for use, thereby limiting the scope of the information that can be included in the new header type.

It may therefore be preferable to define a new header or headers that are suitable for the newly defined links. However, one also needs to support legacy headers in order to continue to support legacy devices and/or legacy features for new devices.

SUMMARY

The below summary section is intended to be merely exemplary and non-limiting.

In an exemplary embodiment of the invention, a method comprising: determining a type of medium access control (MAC) header to transmit in a MAC transmission; setting a value of a notification field in a resource allocation message based on the determined type of MAC header; and transmitting the resource allocation message.

In another exemplary embodiment, a program storage device readable by a machine, tangibly embodying a program of instructions executable by the machine for performing operations, said operations comprising: determining a type of medium access control (MAC) header to transmit in a MAC transmission; setting a value of a notification field in a resource allocation message based on the determined type of MAC header; and transmitting the resource allocation message.

In another exemplary embodiment, an apparatus comprising: means for determining a type of medium access control (MAC) header to transmit in a MAC transmission; means for setting a value of a notification field in a resource allocation message based on the determined type of MAC header; and means for transmitting the resource allocation message.

In another exemplary embodiment, a method comprising: receiving a resource allocation message comprising a notification field; and using a value of the notification field to determine a type of medium access control (MAC) header for a MAC transmission.

In another exemplary embodiment, a program storage device readable by a machine, tangibly embodying a program of instructions executable by the machine for performing operations, said operations comprising: receiving a resource allocation message comprising a notification field; and using a value of the notification field to determine a type of medium access control (MAC) header for a MAC transmission.

In another exemplary embodiment, an apparatus comprising: means for receiving a resource allocation message comprising a notification field; and means for using a value of the notification field to determine a type of medium access control (MAC) header for a MAC transmission.

BRIEF DESCRIPTION OF THE DRAWINGS

The foregoing and other aspects of exemplary embodiments of this invention are made more evident in the following Detailed Description, when read in conjunction with the attached Drawing Figures, wherein:

FIG. 1 shows an exemplary RS use scenario;

FIG. 3 shows a MAC PDU with a conventional (legacy) generic WiMAX MAC header;

FIG. 4 shows an example of the conventional generic MAC header and the various fields that are contained therein, and reproduces FIG. 19a of the IEEE 802.16e-2005 specification in section 6.3.2.1.1 Generic MAC header;

FIG. 5 shows an exemplary MAC PDU with a new generic MAC header;

DETAILED DESCRIPTION

In order for both types of headers (i.e., legacy headers and new headers) to co-exist, some type of signaling should be provided. Prior to the invention described below, this signaling did not exist.

The exemplary embodiments of this invention relate to message header-type notification enabling the co-existence of a legacy header type with one or more new header types on a same radio link Note that while the exemplary embodiments of this invention are described below largely in the context WiMAX technology, the use of these exemplary embodiments is not confined to any one particular type of radio communication technology and/or radio access technology.

Figure 2:
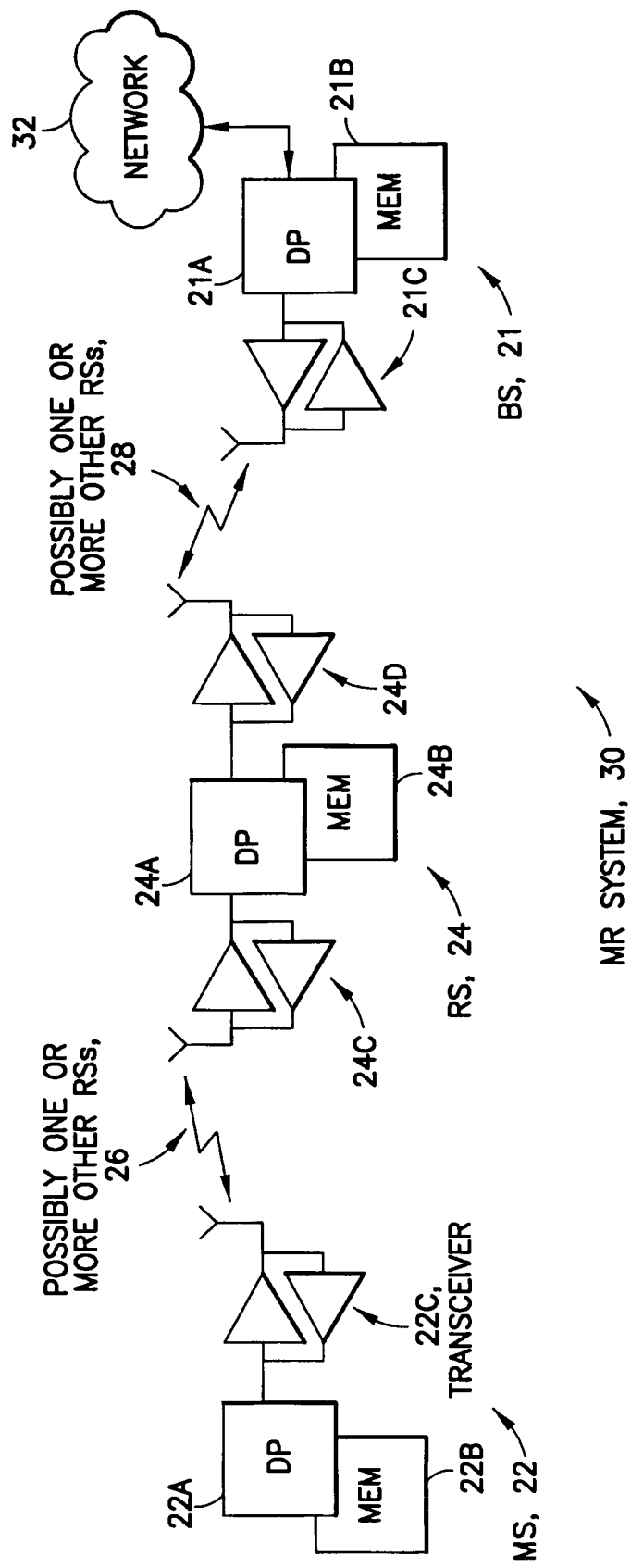
FIG. 2 shows a simplified block diagram of various exemplary electronic devices that are suitable for use in practicing the exemplary embodiments of this invention in a MR system.

Reference is made first to FIG. 2 for illustrating a simplified block diagram of various electronic devices that are suitable for use in practicing the exemplary embodiments of this invention. In FIG. 2 a MR network or system 30 includes at least one MS 22 (or SS), at least one RS 24 and at least one BS (or AP) 21. The MS 22 and BS 21 each include a suitable controller, such as a data processor (DP) 22A, 21A, operatively coupled with a memory (MEM) 22B, 21B, respectively. Each of the MS 22 and BS 21 includes at least one wireless (e.g., radio frequency) transceiver 22C, 21C, respectively. The at least one RS 24 is assumed to be similarly constructed, and may include a DP 24A and associated MEM 24B, and is adapted for communication with the MS 22 and the BS 21 with at least one or two, as shown, wireless transceivers 24C, 24D. Note that the RS 24 may be coupled directly to the MS 22, or indirectly coupled via one or more other RSs 26, and may be coupled directly to the BS 1, or indirectly coupled via one or more other RSs 28. Any such additional RSs 26, 28 may have a structure and/or components similar to the illustrated RS 24. Note as well that the MS 22 may be coupled directly to the BS 21, and in this case communication traffic need not pass through the one or more RSs 24, 26, 28. The BS 21 and RS 24 may be represented by the term infrastructure station (IS). The memories 22B, 21B and 24B are assumed to include program instructions, executable by the associated DPs 22A, 21A and 24A, respectively, for operation in accordance with the exemplary embodiments of this invention, as described in further detail below. The BS 21 may further be coupled to one or more components (e.g., a radio network controller), nodes, networks 32, network backbones or systems, such as the internet, for example.

In general, the exemplary embodiments of this invention may be implemented at least in part by computer software executable by the DPs 22A, 21A, 24A, or by hardware, or by a combination of software and hardware.

In general, the various exemplary embodiments of the MS 22 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities music storage and playback appliances having wireless communication capabilities, Internet appliances permitting wireless Internet access and browsing, as well as portable units or terminals that incorporate combinations of such functions.

The MEMs 22B, 21B and 24B may be of any type suitable to the local technical environment and may be implemented using any suitable data storage technology, such as semiconductor-based memory devices, flash memory, magnetic memory devices and systems, optical memory devices and systems, fixed memory and removable memory, as non-limiting examples. The DPs 22A, 21A and 24A may be of any type suitable to the local technical environment, and may include one or more of general purpose computers, special purpose computers, microprocessors, digital signal processors (DSPs) and processors based on a multi-core processor architecture, as non-limiting examples.

FIG. 4 shows the fields of a conventional generic MAC header. Reference in this regard can be had to IEEE Std 802.16e™-2005, generally section 6.3.2.1 "MAC header formats." Note that the MAC header includes the header type (HT) field. When HT=0, the generic MAC header begins each MAC PDU containing either MAC management messages or CS data. When HT=1, it indicates a MAC header format without payload.

In accordance with the exemplary embodiments of this invention, a header type notification (also referred to herein as a HT_Notification or a HT_Notification IE) is provided in a broadcast/unicast message (e.g., in a DL-MAP/R-DL-MAP/UL-MAP/HARQ-MAP IE message). The notification may be provided burst by burst, or frame by frame, or zone by zone within the frame, as non-limiting examples.

FIG. 5 shows a MAC PDU 10 with a new generic MAC header 20. The notification of the presence of the new generic MAC header 20 on the radio link may be made, for example, in a broadcast/unicast message, which is assumed to include at least one bit for defining the HT_Notification IE or a field 25 (see FIG. 6) that specifies a type of MAC header that is used.

Reference with regard to UL and DL MAP messages may be found in the IEEE 802.16e™-2005 specification generally, and also in a publication entitled: IEEE 802.16 Wireless MAN, "Air Interface for Fixed Broadband Wireless Access Systems." As is stated on pages 15 and 16, for channel access the UL-MAP defines uplink channel access and defines uplink data burst profiles, while the DL-MAP defines the downlink data burst profiles. The UL-MAP and DL-MAP are both transmitted in the beginning of each downlink subframe (FDD and TDD).

Figure 6:
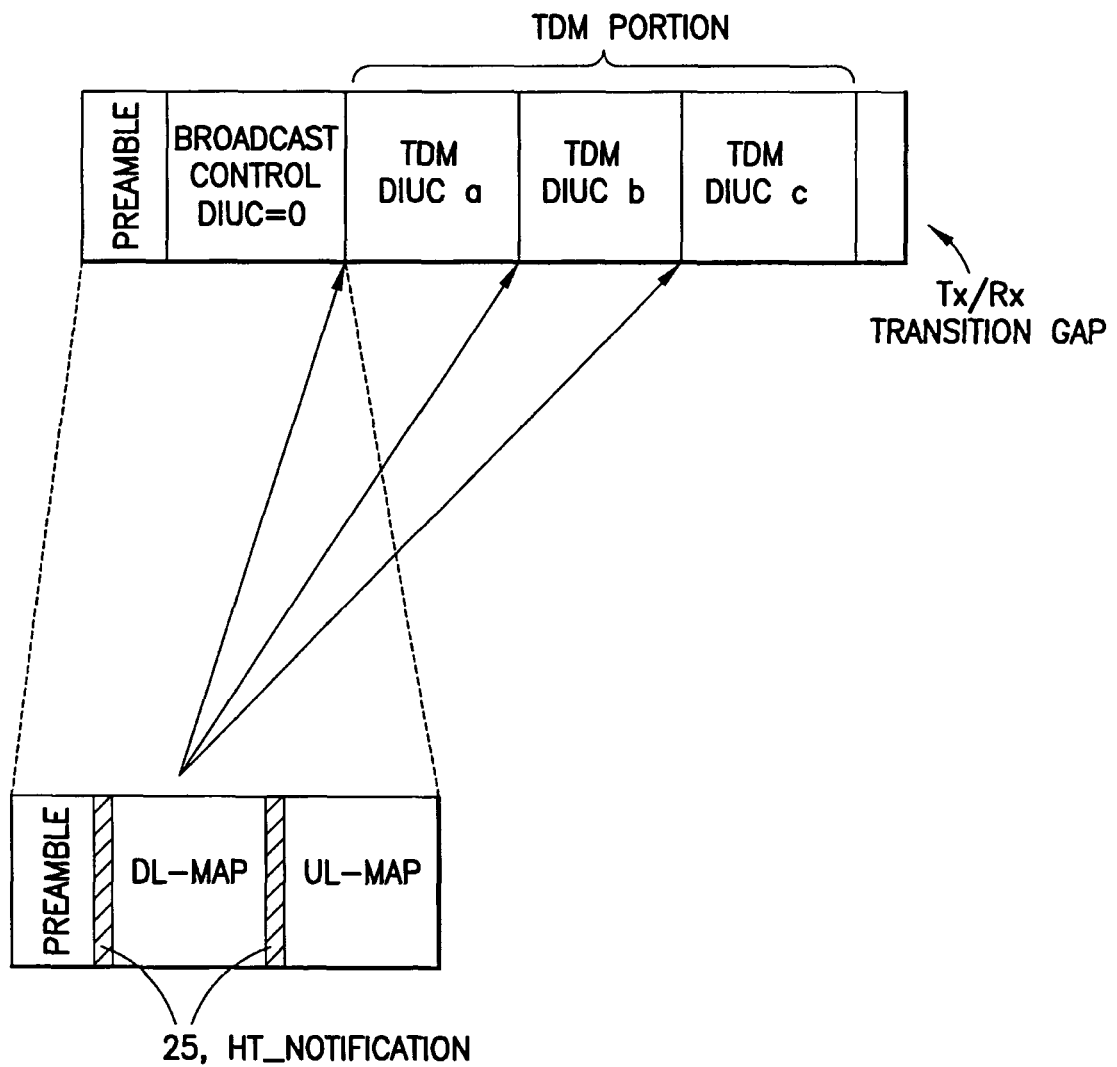
FIG. 6 shows a non-limiting example of a TDD DL subframe containing DL-MAP and UL-MAP portions that are modified in accordance with the exemplary embodiments of this invention to include HT_Notification fields.

FIG. 6 shows a non-limiting example of a TDD DL subframe containing DL-MAP and UL-MAP portions that are modified in accordance with the exemplary embodiments of this invention to include HT_Notification fields 25. Note that in other exemplary embodiments, a different number of HT_Notification fields (e.g., only one of the HT_Notification fields 25) may be present in the UL-MAP and/or the DL-MAP. It should also be noted that the HT_Notification field 25 may be placed anywhere in the DL/UL-MAP.

With the use of HT_Notification field 25, one may define a new generic MAC header on the radio link, without any limitations imposed by conventional (legacy) header types, enabling both the legacy and new header types to co-exist on a same radio link. In this manner, new devices can be introduced without affecting support for legacy devices. Furthermore, one may also provide legacy features to new devices in an efficient manner. The HT_Notification field 25 can be provided for one or both of the UL and DL to introduce new generic MAC headers in either direction.

For example, the exemplary embodiments of this invention can be implemented for the IEEE 802.16 standard in the following manner (and a similar technique can be applied to other technologies) in order to provide header type notification via broadcast/unicast signaling messages, where it is assumed that the broadcast/unicast signaling messages define the resource assignment/allocation within the frame.

In WiMAX, the DL-MAP/UL-MAP is used to provide the resource assignment or allocation within the frame (or next frame) on the access link (BS-MS link). In a similar manner, the R-MAP/R-DL-MAP/R-UL-MAP may be used to provide the resource assignment for the frame (or next few frame) on the relay link (e.g., BS-RS, RS-RS links).

The HT_Notification field 25 can be used in the DL-MAP/UL-MAP/R-MAP/R-DL-MAP/R-UL-MAP to indicate the type of header that is used to transmit the MAC PDU. The HT_Notification field 25 in this message informs the receiving node of the type of generic MAC header that is used to transmit the MAC PDU.

There are a number of different ways to implement the use of the HT_Notification field or IE 25.

As one non-limiting example, and for a case where the HT_Notification field 25 is inserted into a common part of the broadcast/unicast message (e.g., where resource assignment within the frame is specified and MPDUs are transmitted), then it may be interpreted to apply to the entirety of the burst specified in the message.

As another non-limiting example, for a case where the HT_Notification field 25 is inserted into an IE that defines the resource assignment for the MAC PDU transmission for a single burst, then the HT_Notification field 25 may apply only to that specific burst.

The HT_Notification field 25 can comprise any suitable number of bits. However, to reduce overhead in broadcast messages, it may be desirable to use as few bits as possible.

Note that the MAC PDU is constructed of three parts. When the MAC PDU is transmitted, only the generic MAC header is mandatory and the other parts are optional (see FIGS. 3 and 5).

As a non-limiting example, assume that the HT_Notification field 25 is one bit in length. If HT_Notification field=0, then a legacy generic MAC header is used to transmit the MAC PDU (as shown in FIG. 3). However, if the HT_Notification field=1, then this is interpreted by the receiving node (which could be any node shown in FIGS. 1 and 2) that a new (non-legacy) generic MAC header is used to transmit the MAC PDU (as shown in FIG. 5). If two bits are used, then HT_Notification field=00 may indicate that a legacy generic MAC header is used to transmit the MAC PDU, while the other possible values (01, 10, 11) specify a type of new MAC header that is used to transmit the MAC PDU (e.g., as shown in FIG. 5). In a similar fashion, and as a further non-limiting example, the use of three bits enables the specification of up to seven different types of new MAC headers.

With the aid of the HT_Notification field 25 in the DL-MAP/UL-MAP/R-MAP/R-DL-MAP/R-UL-MAP (or more generally in any resource assignment message/allocation message), both legacy and newly defined generic MAC headers may co-exist in a same radio network and/or on a same radio link.

Note that this feature can be readily implemented as well for relay links where there is a need to define a new generic MAC header because of inherent limitations and/or overhead of the conventional IEEE 802.16e generic MAC header. Also, both new and legacy generic MAC headers can co-exist on the relay links such that both newly defined and legacy features can be used.

The advantages that are realized by the use of the exemplary embodiments of this invention are several. For example, the technique is backwards compatible. Further, if used for messages between RS 4 and the BS 1, the introduction of new MAC header types is simplified. Further, the technique may be used between the IS and MS 2 so that an "enhanced MS" can also take advantage of this invention with little additional overhead.

In general, the exemplary embodiments of this invention provide an enhancement to broadcast/unicast messages (e.g. DL-MAP/R-DL MAP/HARQ-MAP IE/DCD/UCD) to define a MAC header type field to distinguish the use of MAC headers on the radio link.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 7:
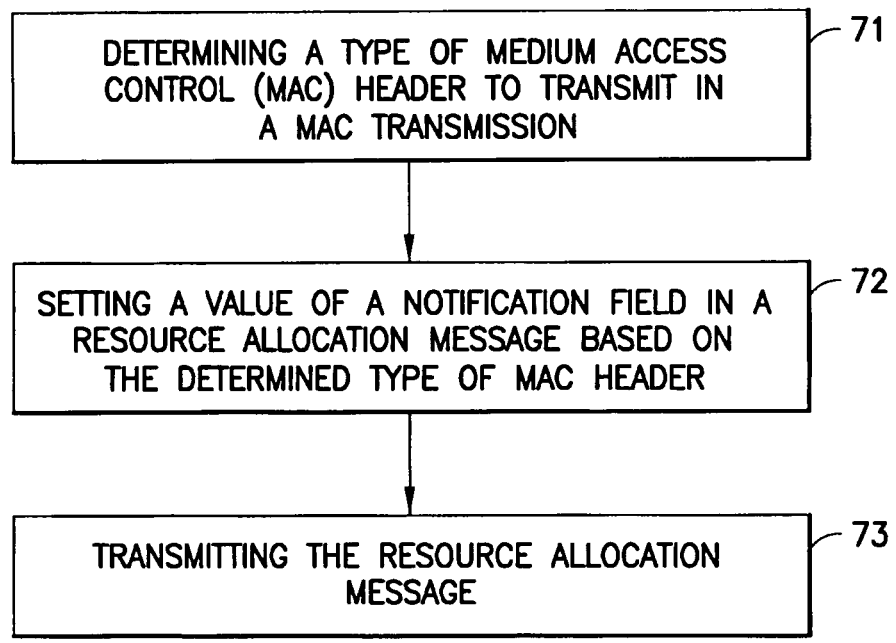
FIG. 7 is a logic flow diagram that depicts a non-limiting example of a method, and the operation of a computer program product, executed by a component of a communication system, in accordance with the exemplary embodiments of this invention.

(1) In one exemplary embodiment, and as illustrated in FIG. 7, a method comprising: determining a type of medium access control (MAC) header to transmit in a MAC transmission (71); setting a value of a notification field in a resource allocation message based on the determined type of MAC header (72); and transmitting the resource allocation message (73).

A method as in the previous, wherein the MAC transmission comprises at least one MAC protocol data unit (PDU). A method as in any above, wherein the resource allocation message is transmitted via a broadcast transmission. A method as in any above, wherein the resource allocation message comprises at least one of a downlink map, an uplink map, a relay map, a relay downlink map or a relay uplink map. A method as in any above, wherein the method is implemented (e.g., utilized, executed) by a base station, an access point or a relay station. A method as in any above, wherein the method is utilized (e.g., implemented, executed) within an IEEE 802.16-type wireless communication network.

A method as in any above, wherein the method is implemented (e.g., utilized, executed) by a base station, an access point or a relay station of a wireless communication network. A method as in any above, wherein the method is implemented (e.g., utilized, executed) within a wireless communication network. A method as in any above, where the notification field is inserted in a common part of the resource allocation message where resource allocation within a frame is specified, and wherein the notification field is (intended) to be interpreted by a receiving node as applying to an entirety of a burst specified in the resource allocation message. A method as in any above, where the notification field is inserted into an information element that defines a resource allocation for the MAC transmission for a single burst, and wherein the notification field is (intended) to be interpreted by a receiving node as applying to only a specific burst specified in the resource allocation message.

A method as in any above, further comprising: transmitting the MAC transmission. A method as in any above, wherein the MAC transmission comprises a broadcast transmission or a unicast transmission. A method as in any above, wherein the resource allocation message is transmitted via a unicast transmission. A method as in any above, wherein the resource allocation message comprises a resource assignment message. A method as in any above, wherein the notification field comprises a HT_Notification field. A method as in any above, wherein the method is implemented by a computer program. A method as in any above, wherein the method is implemented by a computer program stored on a tangible, computer-readable medium (e.g., a memory, a storage device).

(2) In another exemplary embodiment, a program storage device readable by a machine, tangibly embodying a program of instructions executable by the machine for performing operations, said operations comprising: determining a type of medium access control (MAC) header to transmit in a MAC transmission (71); setting a value of a notification field in a resource allocation message based on the determined type of MAC header (72); and transmitting the resource allocation message (73).

A program storage device as in the previous, wherein the MAC transmission comprises at least one MAC protocol data unit (PDU). A program storage device as in any above, wherein the resource allocation message is transmitted via a broadcast transmission. A program storage device as in any above, wherein the resource allocation message comprises at least one of a downlink map, an uplink map, a relay map, a relay downlink map or a relay uplink map. A program storage device as in any above, wherein the machine comprises a base station, an access point or a relay station. A program storage device as in any above, wherein the machine comprises a node of an IEEE 802.16-type wireless communication network.

A program storage device as in any above, wherein the machine comprises a base station, an access point or a relay station of a wireless communication network. A program storage device as in any above, wherein the machine comprises a node of a wireless communication network. A program storage device as in any above, where the notification field is inserted in a common part of the resource allocation message where resource allocation within a frame is specified, and wherein the notification field is (intended) to be interpreted by a receiving node as applying to an entirety of a burst specified in the resource allocation message. A program storage device as in any above, where the notification field is inserted into an information element that defines a resource allocation for the MAC transmission for a single burst, and wherein the notification field is (intended) to be interpreted by a receiving node as applying to only a specific burst specified in the resource allocation message.

A program storage device as in any above, said operations further comprising: transmitting the MAC transmission. A program storage device as in any above, wherein the MAC transmission comprises a broadcast transmission or a unicast transmission. A program storage device as in any above, wherein the resource allocation message is transmitted via a unicast transmission. A program storage device as in any above, wherein the resource allocation message comprises a resource assignment message. A program storage device as in any above, wherein the notification field comprises a HT_Notification field.

(3) In another exemplary embodiment, a computer program product comprising program instructions embodied on a tangible computer-readable medium, execution of the program instructions results in operations comprising: determining a type of medium access control (MAC) header to transmit in a MAC transmission (71); setting a value of a notification field in a resource allocation message based on the determined type of MAC header (72); and transmitting the resource allocation message (73).

A computer program product as in the previous, wherein the MAC transmission comprises at least one MAC protocol data unit (PDU). A computer program product as in any above, wherein the resource allocation message is transmitted via a broadcast transmission. A computer program product as in any above, wherein the resource allocation message comprises at least one of a downlink map, an uplink map, a relay map, a relay downlink map or a relay uplink map. A computer program product as in any above, wherein an apparatus comprises the computer readable medium, wherein the apparatus comprises a base station, an access point or a relay station. A computer program product as in any above, wherein an apparatus comprises the computer readable medium, wherein the apparatus comprises a node of an IEEE 802.16-type wireless communication network.

A computer program product as in any above, wherein an apparatus comprises the computer readable medium, wherein the apparatus comprises a base station, an access point or a relay station of a wireless communication network. A computer program product as in any above, wherein an apparatus comprises the computer readable medium, wherein the apparatus comprises a node of a wireless communication network. A computer program product as in any above, where the notification field is inserted in a common part of the resource allocation message where resource allocation within a frame is specified, and wherein the notification field is (intended) to be interpreted by a receiving node as applying to an entirety of a burst specified in the resource allocation message. A computer program product as in any above, where the notification field is inserted into an information element that defines a resource allocation for the MAC transmission for a single burst, and wherein the notification field is (intended) to be interpreted by a receiving node as applying to only a specific burst specified in the resource allocation message.

A computer program product as in any above, said operations further comprising: transmitting the MAC transmission. A computer program product as in any above, wherein the MAC transmission comprises a broadcast transmission or a unicast transmission. A computer program product as in any above, wherein the resource allocation message is transmitted via a unicast transmission. A computer program product as in any above, wherein the resource allocation message comprises a resource assignment message. A computer program product as in any above, wherein the notification field comprises a HT_Notification field.

(4) In another exemplary embodiment, an apparatus comprising: means for determining (21A) a type of medium access control (MAC) header to transmit in a MAC transmission; means for setting (21A) a value of a notification field in a resource allocation message based on the determined type of MAC header; and means for transmitting (21C) the resource allocation message.

An apparatus as in the previous, wherein the MAC transmission comprises at least one MAC protocol data unit (PDU). An apparatus as in any above, wherein the resource allocation message is transmitted by the means for transmitting via a broadcast transmission. An apparatus as in any above, wherein the resource allocation message comprises at least one of a downlink map, an uplink map, a relay map, a relay downlink map or a relay uplink map. An apparatus as in any above, wherein the apparatus comprises a base station, an access point or a relay station. An apparatus as in any above, wherein the apparatus comprises a node of an IEEE 802.16-type wireless communication network.

An apparatus as in any above, wherein the apparatus comprises a base station, an access point or a relay station of a wireless communication network. An apparatus as in any above, wherein the apparatus comprises a node of a wireless communication network. An apparatus as in any above, where the notification field is inserted in a common part of the resource allocation message where resource allocation within the frame is specified, and wherein the notification field is (intended) to be interpreted by a receiving node as applying to an entirety of a burst specified in the resource allocation message. An apparatus as in any above, where the notification field is inserted into an information element that defines a resource allocation for the MAC transmission for a single burst, and wherein the notification field is (intended) to be interpreted by a receiving node as applying to only a specific burst specified in the resource allocation message.

An apparatus as in any above, further comprising: means for transmitting (21C) the MAC transmission. An apparatus as in any above, wherein the MAC transmission comprises a broadcast transmission or a unicast transmission. An apparatus as in any above, wherein the resource allocation message is transmitted (by said means for transmitting 21C) via a unicast transmission. An apparatus as in any above, wherein the resource allocation message comprises a resource assignment message. An apparatus as in any above, wherein the notification field comprises a HT_Notification field.

(5) In another exemplary embodiment, an apparatus comprising: a processor configured to determine a type of medium access control (MAC) header to transmit in a MAC transmission and to set a value of a notification field in a resource allocation message based on the determined type of MAC header; and a transmitter configured to transmit the resource allocation message.

An apparatus as in the previous, wherein the MAC transmission comprises at least one MAC protocol data unit (PDU). An apparatus as in any above, wherein the resource allocation message is transmitted by the transmitter via a broadcast transmission. An apparatus as in any above, wherein the resource allocation message comprises at least one of a downlink map, an uplink map, a relay map, a relay downlink map or a relay uplink map. An apparatus as in any above, wherein the apparatus comprises a base station, an access point or a relay station. An apparatus as in any above, wherein the apparatus comprises a node of an IEEE 802.16-type wireless communication network.

An apparatus as in any above, wherein the apparatus comprises a base station, an access point or a relay station of a wireless communication network. An apparatus as in any above, wherein the apparatus comprises a node of a wireless communication network. An apparatus as in any above, where the notification field is inserted in a common part of the resource allocation message where resource allocation within the frame is specified, and wherein the notification field is (intended) to be interpreted by a receiving node as applying to an entirety of a burst specified in the resource allocation message. An apparatus as in any above, where the notification field is inserted into an information element that defines a resource allocation for the MAC transmission for a single burst, and wherein the notification field is (intended) to be interpreted by a receiving node as applying to only a specific burst specified in the resource allocation message.

An apparatus as in any above, wherein the transmitter is further configured to transmit the MAC transmission. An apparatus as in any above, wherein the MAC transmission comprises a broadcast transmission or a unicast transmission. An apparatus as in any above, wherein the resource allocation message is transmitted (by said transmitter) via a unicast transmission. An apparatus as in any above, wherein the resource allocation message comprises a resource assignment message. An apparatus as in any above, wherein the notification field comprises a HT_Notification field.

(6) In another exemplary embodiment, a wireless communication system network node, such as a base station or access point, that comprises: a determination unit for determining a type of medium access control (MAC) header to transmit in a MAC transmission; and a setting unit for setting a value of a notification field in a resource allocation message based on the determined type of MAC header.

An apparatus as in the previous, wherein the MAC transmission comprises at least one MAC protocol data unit (PDU). An apparatus as in any above, wherein the resource allocation message comprises at least one of a downlink map, an uplink map, a relay map, a relay downlink map or a relay uplink map. An apparatus as in any above, wherein the apparatus comprises a base station, an access point or a relay station. An apparatus as in any above, wherein the apparatus comprises a node of an IEEE 802.16-type wireless communication network. An apparatus as in any above, further comprising: a transmission unit for transmitting the resource allocation message. An apparatus as in any above, wherein the resource allocation message is transmitted by the transmission unit via a broadcast transmission.

An apparatus as in any above, wherein the apparatus comprises a base station, an access point or a relay station of a wireless communication network. An apparatus as in any above, wherein the apparatus comprises a node of a wireless communication network. An apparatus as in any above, where the notification field is inserted in a common part of the resource allocation message where resource allocation within the frame is specified, and wherein the notification field is (intended) to be interpreted by a receiving node as applying to an entirety of a burst specified in the resource allocation message. An apparatus as in any above, where the notification field is inserted into an information element that defines a resource allocation for the MAC transmission for a single burst, and wherein the notification field is (intended) to be interpreted by a receiving node as applying to only a specific burst specified in the resource allocation message.

An apparatus as in any above, further comprising: a second transmission unit for transmitting the MAC transmission. An apparatus as in any above, wherein the transmission unit comprises the second transmission unit. An apparatus as in any above, wherein the MAC transmission comprises a broadcast transmission or a unicast transmission. An apparatus as in any above, wherein the resource allocation message is transmitted (by said transmission unit) via a unicast transmission. An apparatus as in any above, wherein the resource allocation message comprises a resource assignment message. An apparatus as in any above, wherein the notification field comprises a HT_Notification field.

(7) In another exemplary embodiment, a wireless communication system network node, such as a base station or access point, that comprises: determination circuitry configured to determine a type of medium access control (MAC) header to transmit in a MAC transmission; and setting circuitry configured to set a value of a notification field in a resource allocation message based on the determined type of MAC header.

An apparatus as in the previous, wherein the MAC transmission comprises at least one MAC protocol data unit (PDU). An apparatus as in any above, wherein the resource allocation message comprises at least one of a downlink map, an uplink map, a relay map, a relay downlink map or a relay uplink map. An apparatus as in any above, wherein the apparatus comprises a base station, an access point or a relay station. An apparatus as in any above, wherein the apparatus comprises a node of an IEEE 802.16-type wireless communication network. An apparatus as in any above, further comprising: transmission circuitry configured to transmit the resource allocation message. An apparatus as in any above, wherein the resource allocation message is transmitted by the transmission circuitry via a broadcast transmission.

An apparatus as in any above, wherein the apparatus comprises a base station, an access point or a relay station of a wireless communication network. An apparatus as in any above, wherein the apparatus comprises anode of a wireless communication network. An apparatus as in any above, where the notification field is inserted in a common part of the resource allocation message where resource allocation within the frame is specified, and wherein the notification field is (intended) to be interpreted by a receiving node as applying to an entirety of a burst specified in the resource allocation message. An apparatus as in any above, where the notification field is inserted into an information element that defines a resource allocation for the MAC transmission for a single burst, and wherein the notification field is (intended) to be interpreted by a receiving node as applying to only a specific burst specified in the resource allocation message.

An apparatus as in any above, further comprising: second transmission circuitry configured to transmit the MAC transmission. An apparatus as in any above, wherein the transmission circuitry comprises the second transmission circuitry. An apparatus as in any above, wherein the MAC transmission comprises a broadcast transmission or a unicast transmission. An apparatus as in any above, wherein the resource allocation message is transmitted (by said transmission circuitry) via a unicast transmission. An apparatus as in any above, wherein the resource allocation message comprises a resource assignment message. An apparatus as in any above, wherein the notification field comprises a HT_Notification field. An apparatus as in any above, wherein at least one of the determination circuitry and the setting circuitry comprises an integrated circuit.

Figure 8:
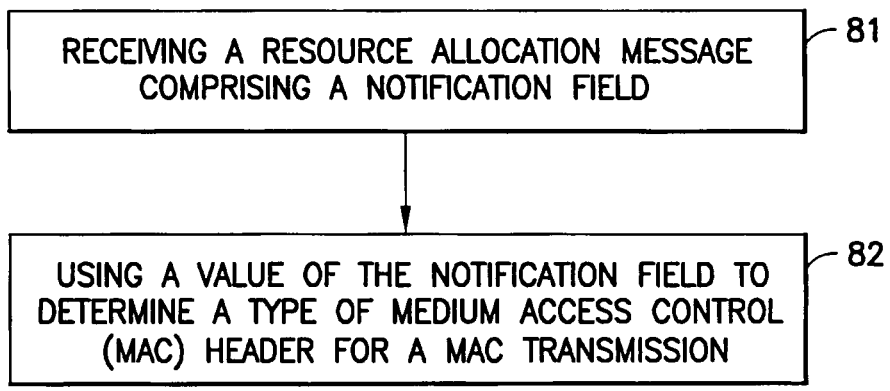
FIG. 8 depicts a flowchart illustrating another non-limiting example of a method, and the operation of a computer program product, executed by a component of a communication system, in accordance with the exemplary embodiments of this invention.

(8) In another exemplary embodiment, and as illustrated in FIG. 8, a method comprising: receiving a resource allocation message comprising a notification field (81); and using a value of the notification field to determine a type of medium access control (MAC) header for a MAC transmission (82).

A method as in the previous, wherein the MAC transmission comprises at least one MAC protocol data unit (PDU). A method as in any above, wherein the resource allocation message is received via a broadcast transmission. A method as in any above, wherein the resource allocation message comprises at least one of a downlink map, an uplink map, a relay map, a relay downlink map or a relay uplink map. A method as in any above, wherein the method is implemented (e.g., utilized, executed) by a user equipment, a user terminal, a mobile station, a relay station, a mobile node, or a subscriber station. A method as in any above, wherein the method is utilized (e.g., implemented, executed) by a node of an IEEE 802.16-type wireless communication network.

A method as in any above, wherein the method is implemented (e.g., utilized, executed) by a user equipment, a user terminal, a mobile station, a relay station, a mobile node, or a subscriber station of a wireless communication network. A method as in any above, wherein the method is implemented (e.g., utilized, executed) by a node of a wireless communication network. A method as in any above, where the notification field is located in a common part of the resource allocation message where resource allocation within the frame is specified, and wherein the notification field is (intended to be) interpreted as applying to an entirety of a burst specified in the resource allocation message. A method as in any above, where the notification field is located in an information element that defines a resource allocation for the MAC transmission for a single burst, and wherein the notification field is (intended to be) interpreted as applying to only a specific burst specified in the resource allocation message.

A method as in any above, further comprising: receiving the MAC transmission. A method as in any above, wherein the MAC transmission comprises a broadcast transmission or a unicast transmission. A method as in any above, wherein the resource allocation message is received via a unicast transmission. A method as in any above, wherein the resource allocation message comprises a resource assignment message. A method as in any above, wherein the notification field comprises a HT_Notification field. A method as in any above, wherein the method is implemented by a computer program. A method as in any above, wherein the method is implemented by a computer program stored on a tangible, computer-readable medium (e.g., a memory, a storage device).

(9) In another exemplary embodiment, a program storage device readable by a machine, tangibly embodying a program of instructions executable by the machine for performing operations, said operations comprising: receiving a resource allocation message comprising a notification field (81); and using a value of the notification field to determine a type of medium access control (MAC) header for a MAC transmission (82).

A program storage device as in the previous, wherein the MAC transmission comprises at least one MAC protocol data unit (PDU). A program storage device as in any above, wherein the resource allocation message is received via a broadcast transmission. A program storage device as in any above, wherein the resource allocation message comprises at least one of a downlink map, an uplink map, a relay map, a relay downlink map or a relay uplink map. A program storage device as in any above, wherein the machine comprises a user equipment, a user terminal, a mobile station, a relay station, a mobile node, or a subscriber station. A program storage device as in any above, wherein the machine comprises a node of an IEEE 802.16-type wireless communication network.

A program storage device as in any above, wherein the machine comprises a user equipment, a user terminal, a mobile station, a relay station, a mobile node, or a subscriber station of a wireless communication network. A program storage device as in any above, wherein the machine comprises a node of a wireless communication network. A program storage device as in any above, where the notification field is located in a common part of the resource allocation message where resource allocation within the frame is specified, and wherein the notification field is (intended to be) interpreted as applying to an entirety of a burst specified in the resource allocation message. A program storage device as in any above, where the notification field is located in an information element that defines a resource allocation for the MAC transmission for a single burst, and wherein the notification field is (intended to be) interpreted as applying to only a specific burst specified in the resource allocation message.

A program storage device as in any above, said operations further comprising: receiving the MAC transmission. A program storage device as in any above, wherein the MAC transmission comprises a broadcast transmission or a unicast transmission. A program storage device as in any above, wherein the resource allocation message is received via a unicast transmission. A program storage device as in any above, wherein the resource allocation message comprises a resource assignment message. A program storage device as in any above, wherein the notification field comprises a HT_Notification field.

(10) In another exemplary embodiment, a computer program product comprising program instructions embodied on a tangible computer-readable medium. Execution of the program instructions results in operations comprising: receiving a resource allocation message comprising a notification field (81); and using a value of the notification field to determine a type of medium access control (MAC) header for a MAC transmission (82).

A computer program product as in the previous, wherein the MAC transmission comprises at least one MAC protocol data unit (PDU). A computer program product as in any above, wherein the resource allocation message is received via a broadcast transmission. A computer program product as in any above, wherein the resource allocation message comprises at least one of a downlink map, an uplink map, a relay map, a relay downlink map or a relay uplink map. A computer program product as in any above, wherein an apparatus comprises the computer readable medium, wherein the apparatus comprises a user equipment, a user terminal, a mobile station, a relay station, a mobile node, or a subscriber station. A computer program product as in any above, wherein an apparatus comprises the computer readable medium, wherein the apparatus comprises a node of an IEEE 802.16-type wireless communication network.

A computer program product as in any above, wherein an apparatus comprises the computer readable medium, wherein the apparatus comprises a user equipment, a user terminal, a mobile station, a relay station, a mobile node, or a subscriber station of a wireless communication network. A computer program product as in any above, wherein an apparatus comprises the computer readable medium, wherein the apparatus comprises a node of a wireless communication network. A computer program product as in any above, where the notification field is located in a common part of the resource allocation message here resource allocation within the frame is specified, and wherein the notification field is (intended to be) interpreted as applying to an entirety of a burst specified in the resource allocation message. A computer program product as in any above, where the notification field is located in an information element that defines a resource allocation for the MAC transmission for a single burst, and wherein the notification field is (intended to be) interpreted as applying to only a specific burst specified in the resource allocation message.

A computer program product as in any above, said operations further comprising: receiving the MAC transmission. A computer program product as in any above, wherein the MAC transmission comprises a broadcast transmission or a unicast transmission. A computer program product as in any above, wherein the resource allocation message is received via a unicast transmission. A computer program product as in any above, wherein the resource allocation message comprises a resource assignment message. A computer program product as in any above, wherein the notification field comprises a HT_Notification field.

(11) In another exemplary embodiment, an apparatus comprising: means for receiving (22C) a resource allocation message comprising a notification field; and means for using (22A) a value of the notification field to determine a type of medium access control (MAC) header for a MAC transmission.

An apparatus as in the previous, wherein the MAC transmission comprises at least one MAC protocol data unit (PDU). An apparatus as in any above, wherein the resource allocation message is received by the means for receiving via a broadcast transmission. An apparatus as in any above, wherein the resource allocation message comprises at least one of a downlink map, an uplink map, a relay map, a relay downlink map or a relay uplink map. An apparatus as in any above, wherein the apparatus comprises a user equipment, a user terminal, a mobile station, a relay station, a mobile node, or a subscriber station. An apparatus as in any above, wherein the apparatus comprises a node of an IEEE 802.16-type wireless communication network.

An apparatus as in any above, wherein the apparatus comprises a user equipment, a user terminal, a mobile station, a relay station, a mobile node, or a subscriber station of a wireless communication network. An apparatus as in any above, wherein the apparatus comprises a node of a wireless communication network. An apparatus as in any above, where the notification field is located in a common part of the resource allocation message where resource allocation within the frame is specified, and wherein the notification field is (intended to be) interpreted as applying to an entirety of a burst specified in the resource allocation message. An apparatus as in any above, where the notification field is located in an information element that defines a resource allocation for the MAC transmission for a single burst, and wherein the notification field is (intended to be) interpreted as applying to only a specific burst specified in the resource allocation message.

An apparatus as in any above, further comprising: means for transmitting (21C) the MAC transmission. An apparatus as in any above, wherein the MAC transmission comprises a broadcast transmission or a unicast transmission. An apparatus as in any above, wherein the resource allocation message is transmitted (by said means for transmitting 21C) via a unicast transmission. An apparatus as in any above, wherein the resource allocation message comprises a resource assignment message. An apparatus as in any above, wherein the notification field comprises a HT_Notification field.

(12) In another exemplary embodiment, an apparatus comprising: a receiver configured to receive a resource allocation message comprising a notification field; and a processor configured to use a value of the notification field to determine a type of medium access control (MAC) header for a MAC transmission.

An apparatus as in the previous, wherein the MAC transmission comprises at least one MAC protocol data unit (PDU). An apparatus as in any above, wherein the resource allocation message is received by the receiver via a broadcast transmission. An apparatus as in any above, wherein the resource allocation message comprises at least one of a downlink map, an uplink map, a relay map, a relay downlink map or a relay uplink map. An apparatus as in any above, wherein the apparatus comprises a user equipment, a user terminal, a mobile station, a relay station, a mobile node, or a subscriber station. An apparatus as in any above, wherein the apparatus comprises a node of an IEEE 802.16-type wireless communication network.

An apparatus as in any above, wherein the apparatus comprises a user equipment, a user terminal, a mobile station, a relay station, a mobile node, or a subscriber station of a wireless communication network. An apparatus as in any above, wherein the apparatus comprises a node of a wireless communication network. An apparatus as in any above, where the notification field is located in a common part of the resource allocation message where resource allocation within the frame is specified, and wherein the notification field is (intended to be) interpreted as applying to an entirety of a burst specified in the resource allocation message. An apparatus as in any above, where the notification field is located in an information element that defines a resource allocation for the MAC transmission for a single burst, and wherein the notification field is (intended to be) interpreted as applying to only a specific burst specified in the resource allocation message.

An apparatus as in any above, wherein the receiver is further configured to receive the MAC transmission. An apparatus as in any above, wherein the MAC transmission comprises a broadcast transmission or a unicast transmission. An apparatus as in any above, wherein the resource allocation message is received (by said receiver) via a unicast transmission. An apparatus as in any above, wherein the resource allocation message comprises a resource assignment message. An apparatus as in any above, wherein the notification field comprises a HT_Notification field.

(13) In another exemplary embodiment, an apparatus comprising: a receiver unit for receiving a resource allocation message comprising a notification field; and a determination unit for using a value of the notification field to determine a type of medium access control (MAC) header for a MAC transmission.

An apparatus as in the previous, wherein the MAC transmission comprises at least one MAC protocol data unit (PDU). An apparatus as in any above, wherein the resource allocation message is received by the receiver unit via a broadcast transmission. An apparatus as in any above, wherein the resource allocation message comprises at least one of a downlink map, an uplink map, a relay map, a relay downlink map or a relay uplink map. An apparatus as in any above, wherein the apparatus comprises a user equipment, a user terminal, a mobile station, a relay station, a mobile node, or a subscriber station. An apparatus as in any above, wherein the apparatus comprises a node of an IEEE 802.16-type wireless communication network.

An apparatus as in any above, wherein the apparatus comprises a user equipment, a user terminal, a mobile station, a relay station, a mobile node, or a subscriber station of a wireless communication network. An apparatus as in any above, wherein the apparatus comprises a node of a wireless communication network. An apparatus as in any above, where the notification field is located in a common part of the resource allocation message where resource allocation within the frame is specified, and wherein the notification field is (intended to be) interpreted as applying to an entirety of a burst specified in the resource allocation message. An apparatus as in any above, where the notification field is located in an information element that defines a resource allocation for the MAC transmission or a single burst, and wherein the notification field is (intended to be interpreted) as applying to only a specific burst specified in the resource allocation message.

An apparatus as in any above, further comprising: a second receiver unit for receiving the MAC transmission. An apparatus as in any above, wherein the receiver unit comprises the second receiver unit. An apparatus as in any above, wherein the MAC transmission comprises a broadcast transmission or a unicast transmission. An apparatus as in any above, wherein the resource allocation message is received (by said receiver unit) via a unicast transmission. An apparatus as in any above, wherein the resource allocation message comprises a resource assignment message. An apparatus as in any above, wherein the notification field comprises a HT_Notification field.

(14) In another exemplary embodiment, an apparatus comprising: receiver circuitry configured to receive a resource allocation message comprising a notification field; and determination circuitry configured to use a value of the notification field to determine a type of medium access control (MAC) header for a MAC transmission.

An apparatus as in the previous, wherein the MAC transmission comprises at least one MAC protocol data unit (PDU). An apparatus as in any above, wherein the resource allocation message is received by the receiver circuitry via a broadcast transmission. An apparatus as in any above, wherein the resource allocation message comprises at least one of a downlink map, an uplink map, a relay map, a relay downlink map or a relay uplink map. An apparatus as in any above, wherein the apparatus comprises a user equipment, a user terminal, a mobile station, a relay station, a mobile node, or a subscriber station. An apparatus as in any above, wherein the apparatus comprises a node of an IEEE 802.16-type wireless communication network.

An apparatus as in any above, wherein the apparatus comprises a user equipment, a user terminal, a mobile station, a relay station, a mobile node, or a subscriber station of a wireless communication network. An apparatus as in any above, wherein the apparatus comprises a node of a wireless communication network. An apparatus as in any above, where the notification field is located in a common part of the resource allocation message where resource allocation within the frame is specified, and wherein the notification field is (intended to be) interpreted as applying to an entirety of a burst specified in the resource allocation message. An apparatus as in any above, where the notification field is located in an information element that defines a resource allocation for the MAC transmission for a single burst, and wherein the notification field is (intended to be) interpreted as applying to only a specific burst specified in the resource allocation message.

An apparatus as in any above, further comprising: second receiver circuitry configured to receive the MAC transmission. An apparatus as in any above, wherein the receiver circuitry comprises the second receiver circuitry. An apparatus as in any above, wherein the MAC transmission comprises a broadcast transmission or a unicast transmission. An apparatus as in any above, wherein the resource allocation message is received (by said receiver circuitry) via a unicast transmission. An apparatus as in any above, wherein the resource allocation message comprises a resource assignment message. An apparatus as in any above, wherein the notification field comprises a HT_Notification field. An apparatus as in any above, wherein the determination circuitry comprises an integrated circuit.

(15) In another exemplary embodiment, an apparatus comprising: receiver circuitry configured to receive a value of a notification field; and determination circuitry configured to use the value of the notification field to determine a type of medium access control (MAC) header for a MAC transmission. An apparatus as in the previous, further comprising one or more aspects of the exemplary embodiments of the invention as further described herein.

(16) A wireless communication system comprising a first apparatus as recited above in number 4 and a second apparatus as recited above in number 11. A wireless communication system as in the previous, further comprising one or more aspects of the exemplary embodiments of the invention as further described herein.

(17) A wireless communication system comprising a first apparatus as recited above in number 5 and a second apparatus as recited above in number 12. A wireless communication system as in the previous, further comprising one or more aspects of the exemplary embodiments of the invention as further described herein.

(18) A method comprising the steps of the method as recited above in number 1 and the steps of the method as recited above in number 8. A method as in the previous, further comprising one or more aspects of the exemplary embodiments of the invention as further described herein.

It should be noted that the various blocks shown in FIGS. 7 and 8 may be viewed as method steps, and/or as operations that result from operation of computer program code, and/or as a plurality of coupled logic circuit elements constructed to carry out the associated function(s).

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

While the exemplary embodiments have been described above primarily in the context of a WiMAX system, it should be appreciated that the exemplary embodiments of this invention are not limited for use with only this one particular type of wireless communication system, and that they may be used to advantage in other wireless communication systems.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all such modifications will still fall within the scope of the non-limiting and exemplary embodiments of this invention.

For example, while the exemplary embodiments have been described above in the context of the IEEE 802.16-type of multi-hop system it should be appreciated that the exemplary embodiments of this invention are not limited for use with only this one particular type of wireless communication system, and that they may be used to advantage in other wireless communication systems.

Further, the specific name: HT_Notification field or IE is not intended to be read in a limiting sense, as the specific information container may be referred to by any desired name.

Further, in another exemplary embodiment HT_Notification can be sent during a capability exchange message, e.g., SBC-REQ/RSP (see IEEE 802.16-2005, sections 6.3.2.3.23 and 6.3.2.3.24). In this embodiment, a first station notifies a second station that it would like communications between said first and second station to make use of a particular MAC header type or set of header types. The second station then confirms or rejects the request. If confirmed, then in subsequent communication between these two stations the specified header type or set of header types is used. Alternately, the first station may notify the second station of its intent to use a particular MAC header type or set of header types without giving the second station the opportunity to confirm or reject. The above-identified notifications may be applicable to a single direction of communication or to both directions of communication between the first and second station. In these cases, the HT_Notification on a frame-by-frame basis may or may not be used.

Further still, in another exemplary embodiment of this invention the HT_Notification can be sent in periodic broadcast messages, e.g., DCD and UCD. This mode can be used to inform the receiving station(s) that the IS only supports a particular set of header types.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   at least one processor; and
   at least one memory operable to store computer program code; and
   wherein the at least one processor is operable to, using the computer program code, cause the apparatus at least to:
      determine a type of medium access control (MAC) header to transmit in a MAC transmission;
      set a value of a notification field in a resource allocation message based on the determined type of MAC header; and
      transmit the resource allocation message; and wherein
      the resource allocation message comprises at least one of a downlink map, an uplink map, a relay map, a relay downlink map and a relay uplink map;
      the notification field is located in a common part of the resource allocation message; and,
      the notification field applies to an entirety of the resource allocation message.

2. The apparatus of claim 1, wherein the MAC transmission comprises at least one MAC protocol data unit (PDU).

3. The apparatus of claim 1, wherein the apparatus further comprises at least one of a base station, an access point and a relay station.

4. An apparatus comprising:
   at least one processor; and
   at least one memory operable to store computer program code; and
   wherein the at least one processor is operable to, using the computer program code, cause the apparatus at least to:
      determine a type of medium access control (MAC) header to transmit in a MAC transmission;
      set a value of a notification field in a resource allocation message based on the determined type of MAC header; and
      transmit the resource allocation message; and wherein
      the resource allocation message comprises at least one of a downlink map, an uplink map, a relay map, a relay downlink map and a relay uplink map;
      the notification field is located in an information element of the resource allocation message that defines a resource allocation for the MAC transmission for a single burst; and
      the notification field applies to only the burst specified in the information element of the resource allocation message.

5. A program storage device readable by a machine, tangibly embodying a program of instructions executable by the machine for performing operations, the operations comprising:
   receiving a resource allocation message comprising a notification field; and using a value of the notification field to determine a type of medium access control (MAC) header for a MAC transmission; and wherein
   the resource allocation message comprises at least one of a downlink map, an uplink map, a relay map, a relay downlink map and a relay uplink map;
   the notification field is located in a common part of the resource allocation message; and,
   the notification field applies to an entirety of the resource allocation message.

6. The program storage device of claim 5, wherein the MAC transmission comprises at least one MAC protocol data unit (PDU).

7. The program storage device of claim 5, wherein the resource allocation message is received via a broadcast transmission.

8. A program storage device readable by a machine, tangibly embodying a program of instructions executable by the machine for performing operations, the operations comprising:
   receiving a resource allocation message comprising a notification field; and using a value of the notification field to determine a type of medium access control (MAC) header for a MAC transmission; and wherein
   the resource allocation message comprises at least one of a downlink map, an uplink map, a relay map, a relay downlink map and a relay uplink map;
   the notification field is located in an information element of the resource allocation message that defines a resource allocation for the MAC transmission for a single burst; and
   the notification field applies to only the burst specified in the information element of the resource allocation message.

9. An apparatus, comprising:
   at least one processor; and
   at least one memory operable to store computer program code; and
   wherein the at least one processor is operable to, using the computer program code, cause the apparatus at least to:
      receive a resource allocation message comprising a notification field; and
      use a value of the notification field to determine a type of medium access control (MAC) header for a MAC transmission; and wherein
      the resource allocation message comprises at least one of a downlink map, an uplink map, a relay map, a relay downlink map and a relay uplink map;

the notification field is located in a common part of the resource allocation message; and, the notification field applies to an entirety of the resource allocation message.

10. The apparatus of claim 9, wherein the MAC transmission comprises at least one MAC protocol data unit (PDU).

11. The apparatus of claim 9, wherein the resource allocation message is received via a broadcast transmission.

12. The apparatus of claim 9, wherein the apparatus comprises a mobile station or a relay station.

13. An apparatus, comprising:
at least one processor; and
at least one memory operable to store computer program code; and
wherein the at least one processor is operable to, using the computer program code, cause the apparatus at least to:
receive a resource allocation message comprising a notification field; and
use a value of the notification field to determine a type of medium access control (MAC) header for a MAC transmission; and wherein
the resource allocation message comprises at least one of a downlink map, an uplink map, a relay map, a relay downlink map and a relay uplink map;
the notification field is located in an information element of the resource allocation message that defines a resource allocation for the MAC transmission for a single burst; and
the notification field applies to only the burst specified in the information element of the resource allocation message.

14. A method comprising:
determining a type of medium access control (MAC) header to transmit in a MAC transmission;
setting a value of a notification field in a resource allocation message based on the determined type of MAC header; and transmitting the resource allocation message; and wherein
the resource allocation message comprises at least one of a downlink map, an uplink map, a relay map, a relay downlink map and a relay uplink map;
the notification field is located in a common part of the resource allocation message; and,
the notification field applies to an entirety of the resource allocation message.

15. The method of claim 14, wherein the MAC transmission comprises at least one MAC protocol data unit (PDU).

16. The method of claim 14, wherein transmitting the resource allocation message comprises transmitting the resource allocation message using a broadcast transmission.

17. The method of claim 14, wherein the method is implemented by at least one of a base station, an access point and a relay station.

18. A method comprising:
receiving a resource allocation message comprising a notification field; and
using a value of the notification field to determine a type of medium access control (MAC) header for a MAC transmission; and wherein
the resource allocation message comprises at least one of a downlink map, an uplink map, a relay map, a relay downlink map and a relay uplink map;
the notification field is located in a common part of the resource allocation message; and,
the notification field applies to an entirety of the resource allocation message.

19. The method of claim 18, wherein the MAC transmission comprises at least one MAC protocol data unit (PDU).

20. The method of claim 18, wherein receiving the resource allocation message comprises receiving the resource allocation message using a broadcast transmission.

21. The method of claim 18, wherein the method is implemented by at least one of a mobile station and a relay station.

* * * * *